US006935322B2

(12) United States Patent
Grant

(10) Patent No.: US 6,935,322 B2
(45) Date of Patent: Aug. 30, 2005

(54) NITROUS OXIDE/FUEL INJECTOR FOR AIR INTAKE TO INTERNAL COMBUSTION ENGINE

(76) Inventor: Barry S. Grant, Rte. 1, Box 1900, Dahlonega, GA (US) 30533

(*) Notice: Subject to any disclaimer, the term of this patent is extended or adjusted under 35 U.S.C. 154(b) by 0 days.

(21) Appl. No.: 10/688,631

(22) Filed: Oct. 17, 2003

(65) Prior Publication Data

US 2005/0081827 A1 Apr. 21, 2005

(51) Int. Cl.[7] .............................................. F02M 23/00
(52) U.S. Cl. ...................................... 123/585; 123/1 A
(58) Field of Search ................................ 123/585, 1 A, 123/492, 531

(56) References Cited

U.S. PATENT DOCUMENTS

| 4,798,190 A | | 1/1989 | Vaznaian et al. | ............. 123/531 |
| 4,827,888 A | | 5/1989 | Vaznaian et al. | ............. 123/531 |
| 5,269,275 A | * | 12/1993 | Dahlgren | ...................... 123/492 |
| 5,444,628 A | * | 8/1995 | Meaney et al. | .............. 123/531 |
| 5,495,841 A | * | 3/1996 | Gillbrand et al. | ............. 123/492 |
| 5,699,776 A | | 12/1997 | Wood et al. | .................. 123/531 |
| 5,839,418 A | | 11/1998 | Grant | ............................ 123/585 |
| 5,890,476 A | | 4/1999 | Grant | ............................ 123/585 |
| 6,065,691 A | * | 5/2000 | West | ............................ 239/407 |
| 6,116,225 A | | 9/2000 | Thomas et al. | .............. 123/590 |
| 6,378,512 B1 | | 4/2002 | Staggemeier | ................ 123/585 |
| 6,453,894 B1 | | 9/2002 | Fischer et al. | ............... 123/585 |
| 6,523,530 B2 | | 2/2003 | Evert et al. | ................... 123/585 |
| 6,561,172 B1 | | 5/2003 | Chetnut et al. | .............. 123/585 |

OTHER PUBLICATIONS

"Barry Grant" Catalog, 1984–2004—cover and p. 106.

* cited by examiner

Primary Examiner—Noah P. Kamen
(74) Attorney, Agent, or Firm—Thomas, Kayden, Horstemeyer & Risley, LLP

(57) ABSTRACT

A nitrous oxide and fuel injector assembly is mounted to an air supply conduit of an internal combustion engine. A support platform (24), (66) is placed inside the air supply conduit in abutment with the external wall of the air supply conduit, with connector conduits (26), (68) extending from the support platform through openings in the air supply conduit, so the connector conduits protrude outwardly from the air supply conduit. Fasteners, such as internally threaded nuts (34), are threaded onto the external threads of the connector conduits, holding the assembly in place on the air supply conduit. Fuel injectors (20), (64) are threaded into the internal threaded through bores (28) of the connector conduits.

14 Claims, 2 Drawing Sheets

NITROUS OXIDE/FUEL INJECTOR FOR AIR INTAKE TO INTERNAL COMBUSTION ENGINE

FIELD OF THE INVENTION

This invention relates generally to a fuel and nitrous oxide supply system for a high performance internal combustion engine. More particularly, the invention involves the injection of fuel and nitrous oxide into the air conduit leading from an air filter toward an internal combustion engine.

BACKGROUND OF THE INVENTION

In order to provide more power with an internal combustion engine, without changing any of its integral components, such as cam shafts, cylinder heads, pistons, etc., it is possible to supply a larger volume of oxygen and fuel at the proper ratio to the cylinders. The induction of this larger volume of oxygen/fuel mixture produces more power because on each cycle of the engine more oxygen and fuel is available to be burned, which has a direct relationship to the power output generated by the engine.

This can be done in several ways. One common way is to use turbo chargers and blowers to increase the inlet pressure of the fuel/air mixture delivered to the combustion cylinders. Both turbos and blowers induce a mixture of fuel and atmospheric air to move at higher pressures to the cylinders.

Another way is injecting oxygen in the form of oxygen-rich nitrous oxide into the air inlet manifold of the engine so as to increase the amount of oxygen received in the cylinders during each cycle of the pistons. When more nitrous oxide is delivered to each cylinder, more fuel can be delivered to the same cylinder, and more power is generated during each cycle of the engine. The least costly of these procedures is the use of nitrous oxide and fuel injection.

Fuel and nitrous oxide injector nozzles have been developed in the prior art for delivering fuel such as gasoline and nitrous oxide to the air stream moving to the combustion cylinders. Nozzles of this type are described in U.S. Pat. No. 5,890,476.

In the conventional operation of internal combustion engines, low torque is generated at low speeds and higher torque is able to be generated at higher speeds. The injection of fuel and nitrous oxide enables the enthusiast to increase the engine torque, particularly at the lower speeds, but continuously throughout the increasing speeds. A problem with the immediate increase in torque at low speeds is that the drive wheels of the vehicle tend to spin and therefore lose traction with the road. Therefore, it would be desirable to moderate the amount of torque generated by the engine at slower speeds, and increase the amount of torque at increasing speeds so as to control the slippage of the wheels against the road surface.

While the fuel delivery nozzles that deliver fuel and nitrous oxide have been successful in increasing the performance of internal combustion engines, the mounting of the nozzles in optimum locations about the engine and its components is sometimes inconvenient and impractical, so that the car enthusiast is deterred from modifying his/her vehicle to include the nozzles.

It is to the solution of the foregoing problems that this invention is directed.

SUMMARY OF THE INVENTION

Briefly described, the present invention involves a fuel and nitrous oxide injection assembly, the method of mounting the assembly to the air supply conduit, and method of injecting fuel and nitrous oxide into the air intake of an internal combustion engine. The injector assembly is mounted to and supported by the air supply conduit.

In one embodiment of the invention, a support platform is positioned inside the air supply conduit, flush against the interior surface of the external wall of the air supply conduit. Fuel injectors are inserted through openings formed in the air supply conduit, and mounted to the support platform. The fuel injectors pass separate streams of super cooled nitrous oxide and fuel into the air supply conduit, and mix the nitrous oxide and fuel as they emerge from the nozzle. One or more nozzles can be mounted in this way so as to inject the nitrous oxide and fuel into the air stream.

In a preferred embodiment of the invention, the support platform has a bearing surface that corresponds in shape to the facing internal surface of the external wall of the air supply conduit, so as to lie flush against the facing internal surface of the wall. A connector conduit for each fuel injector nozzle extends from the support platform through openings in the external wall of the air supply conduit, and the fuel injectors are mounted in the connector conduits.

If desired, fasteners are mounted to the connector conduits to hold the support platform in abutment with the interior of the external wall of the air supply conduit.

The fuel injectors suitable for use with this fuel injection assembly are of the type disclosed in my U.S. Pat. No. 5,890,476 and in other patents listed as references cited therein. The entire disclosure of U.S. Pat. No. 5,890,476 is incorporated herein by reference.

Each injector nozzle includes a fuel passage and a nitrous oxide passage that keeps the fluids separated until they enter the air stream. The fluids are expelled from the injectors in a configuration that enhances the evaporation of the liquid nitrous oxide into a gas and the fine atomization of the fuel and the mixing of the nitrous oxide and the fuel as they enter in the air stream.

While one injector nozzle can be used as described, a preferred embodiment of the invention provides a plurality of injector nozzles mounted to the support platform, with the injector nozzles being spaced from one another so that the injected fuel and nitrous oxide can be evenly distributed in the air stream.

Typically, the fuel injection assembly disclosed herein will be mounted in a convenient location about the air supply conduit, making it expedient and convenient to install, and easy to inspect. An example is to place the fuel injection assembly so that its protruding injector nozzles extend laterally from the air supply conduit, avoiding placement at the lower portion of the air supply conduit where it is inconvenient to mount and service, and avoiding the upper surface of the air supply conduit, where the projecting nozzles and their connecting hoses might interfere with the hood of the vehicle. The fuel injector assembly is compact and is configured so that it can be placed at various locations about the air supply conduit.

The supply of fuel and nitrous oxide to the injector nozzles is controlled so that the volume of fuel and nitrous oxide can be increased in response to the increasing speed of the engine, so that a smaller amount of nitrous oxide is injected at low speed so as to avoid inadvertent spinning of the wheels against the road surface, and as the speed of the vehicle increases and there is less risk of spinning the wheels on the road surface, the amount of fuel and nitrous oxide can be increased, providing increased torque.

In a preferred embodiment of the invention, a method of increasing the amount of fuel and nitrous oxide injection in the air stream moving to the cylinders of the engine is to begin the injection through one of the injector nozzles at slower speeds of the vehicle, and then as the vehicle speed increases, adding injection through another one of the injector nozzles so that more fuel and nitrous oxide is injected into the air stream. Then, as the speed of the vehicle continues to increase, adding more nitrous oxide and fuel through another one of the injector nozzles so that even more fuel and nitrous oxide are added through more nozzles to the air stream, and so on, so that the volume of injection is accomplished in sequence from injector nozzle to injector nozzle.

The sequence of injection can be varied. For example, the injection can start with one injector nozzle and in the second phase two or more nozzles can begin their injection simultaneously, or the injection can start with two injector nozzles and then subsequent nozzles can be added one at a time. Other injection sequences can be used with the objective being to add the fuel and nitrous oxide to the air stream at the optimum rate.

Solenoid valves are used to control the supply of fuel and nitrous oxide to the plurality of injector nozzles, with the solenoids usually being responsive to a computer that determines the speed of the vehicle in order to control the use of the nozzles.

The air supply conduit leading from the air filter to the engine usually is in an easily accessible position where the support platform can be placed inside the air supply conduit, making the installation expedient for the mechanic, and having the injector nozzles and their connector conduits positioned on the support platform at the factory where their locations and positions are accurately positioned for optimum performance. Except for forming small holes for receiving the fuel injectors, the air supply conduit usually does not need to be modified when the fuel injection assembly is mounted to the air supply conduit. If the owner of the vehicle removes the fuel injection assembly from the air supply conduit, only the small holes need be repaired or the air supply conduit need be replaced to restore the engine to its previous condition.

Therefore, it is an object of this invention to provide an improved fuel and nitrous oxide injection system for high performance internal combustion engines.

Another object of this invention is to provide an injection system for injecting fuel and nitrous oxide in the air stream moving toward the combustion cylinders of an internal combustion engine, which can be conveniently and expediently applied to the engine.

Another object of this invention is to provide an improved fuel and nitrous oxide injection system for an internal combustion engine that applies fuel and nitrous oxide in varying amounts in accordance with the performance of the vehicle.

Another object of this invention is to provide a fuel and nitrous oxide injection assembly in combination with an air supply conduit of an internal combustion engine, whereby the support of the injector nozzles is accomplished with only a small external protrusion of the nozzles from the air supply conduit.

Another object of this invention is to provide an expedient and inexpensive process of mounting injector nozzles on air supply conduits extending toward an internal combustion engine.

Other objects, features and advantages of this invention will become apparent upon reading the following specification, when taken in conjunction with the accompanying drawings.

DETAILED DESCRIPTION

Figure 1:
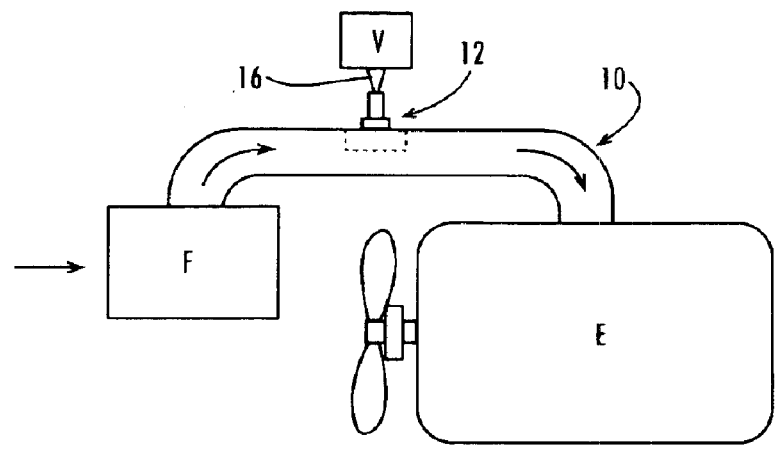
FIG. 1 is a schematic illustration of an air filter, an internal combustion engine, an air supply conduit leading from the filter to the engine, and the nitrous oxide/fuel injection assembly for injecting fuel and nitrous oxide into the air stream moving through the air supply conduit.

Referring now in more detail to the drawings in which like numerals indicate like parts throughout the several views, FIG. 1 schematically illustrates an internal combustion engine E, a filter F, and an air supply conduit 10 for delivering a stream of filtered air from the air filter F to the engine E. The fuel injector assembly 12 is mounted to the air supply conduit 10 and communicates with the stream of air moving through the air supply conduit. A control valve V is controlled by solenoids. A plurality of delivery tubes 16 extend from the control valve V to the fuel injector assembly 12.

Figure 2:
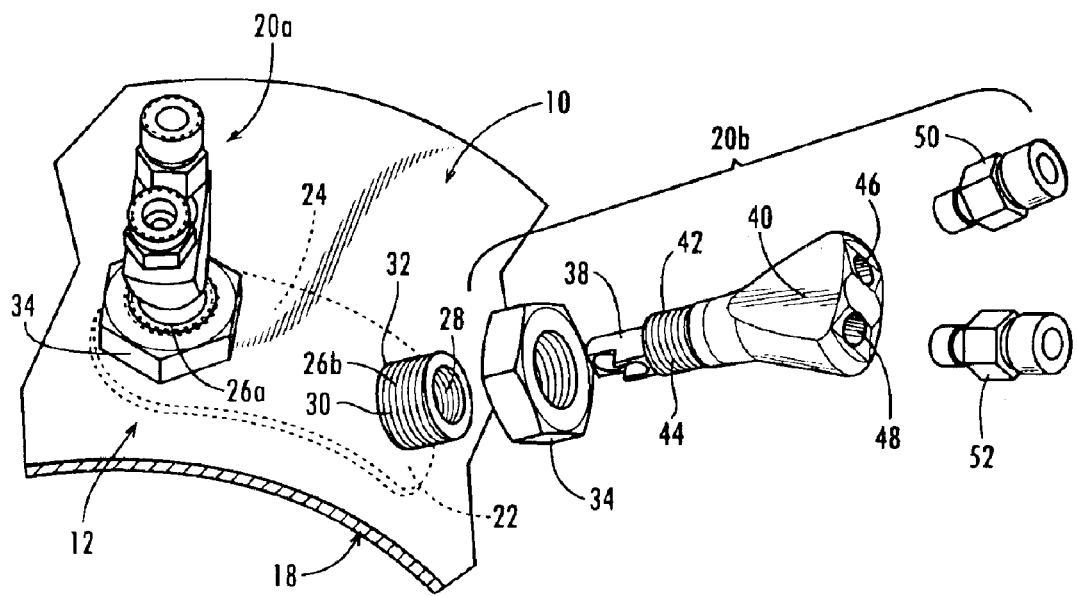
FIG. 2 is a perspective illustration of a pair of fuel injectors, one being assembled and the other shown in expanded form to illustrate its parts, together with the support platform, its connector conduits, and a portion of the air supply conduit.

As shown in FIG. 2, the air supply conduit 10 can be of circular cross-sectional configuration, although other shapes, such as rectangular in cross-section, are present in some vehicles. The fuel injector assembly 12 is mounted to the external wall 18 of the air supply conduit 10. In the embodiment of FIG. 2, the fuel injector assembly 12 includes two fuel injectors 20A and 20B, and arcuate support platform 22. In the embodiment of FIG. 2, since the air supply conduit 10 is circular in cross-section, the support platform 22 is arcuate, having a bearing surface that engages the inside surface of the external wall 18 of the air supply conduit 10. The bearing surface is shaped so that it corresponds in shape to the shape the facing surface of the air supply conduit 10, and lies in continuous abutment with the facing surface of the air supply conduit.

In those instances where the air supply conduit 10 is of a non-circular cross-sectional shape, such as square, rectangular, or other shapes, the bearing surface 24 of the support platform will have a size and shape that corresponds to the facing shape of the external wall or other surface to which it is mounted, so a to lie in abutment with and be supported by the facing surface.

The support platform includes connector conduits, such as connector conduit 26B that is of cylindrical shape, and which extends generally perpendicular to the bearing surface 24 of support platform 22. A similar connector conduit 26A is positioned at a spaced interval from connector conduit 26B. Both connector conduits 26A and 26B include an internal threaded through bore 28 and external threads 30. The internal threaded through bore 28 extends through both the connector conduit and the support platform 22, forming a passage through the support platform 22.

The installer of the fuel injection assembly forms holes or openings 32 in the air supply conduit 10 that are sized and spaced so as to receive the connector conduits 26A and 26B, as shown in FIG. 2. When the fuel injector assembly 12 is to be installed in the air supply conduit 10, the installer places the support platform 22 inside the air supply conduit so that the bearing surface 24 of the support platform 22 engages the external wall 18 of the air supply conduit, and the worker extends the connector conduits 26A and 26B through the holes 32 so that the connector conduits 26A and 26B protrude through the holes, to the outside of the air supply conduit, as shown at the right sides of FIGS. 2 and 3.

Fasteners, such as threaded nuts 34 are threaded onto the external threads 30 of the connector conduits 26A and 26B. The threaded nuts function as fasteners in that they bear against the air supply conduit, trapping the material of the air supply conduit against the mounting platform. This holds the connector conduits 26A and 26B, and therefore the support platform 22, in the positions as shown, with the bearing surface 24 of the support platform in continuous engagement with the internal facing surface of the air supply conduit 10. The support platform derives its support from the air supply conduit 10.

Figure 4:
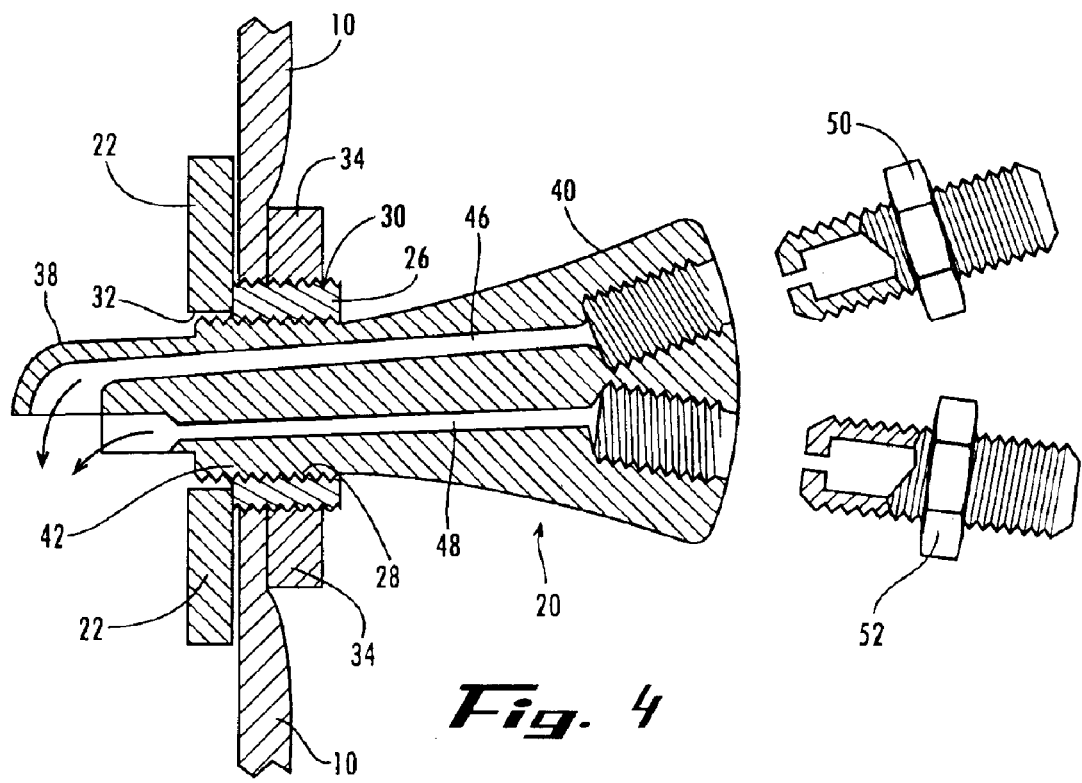
FIG. 4 is a cross-sectional view of a fuel injector, showing how it is mounted to the external wall of the air supply conduit.

Fuel and nitrous oxide injectors 20A and 20B are mounted to the connector conduits 26A and 26B. As shown in FIG. 4, each injector includes a nozzle tip 38 that is inserted through a connector conduit 26A or 26B, through the hole 32 in the external wall 18 of the air supply conduit, and through the support platform 22, so that the nozzle tip protrudes into the air supply conduit 10. The nozzle base 40 remains outside the air supply conduit and extends outwardly therefrom, and an intermediate body portion 42 of the injector nozzle is positioned between the tip 38 and base 40. The intermediate body portion 42 includes external spiral connector threads 44. The threads 44 engage the internal threaded through bore 28 so as to mount the fuel injector to the support platform 22 and its connector conduits 26.

As shown in FIG. 4, a pair of substantially parallel internal conduits 46 and 48 extend from the nozzle base 40, through the intermediate body portion 42, to the nozzle tip 38. The first conduit 46 is used for the supply of liquid nitrous oxide, and the second conduit 48 is used for the supply of gasoline or other combustible fuel. Threaded counter bores are formed in the internal conduits 46 and 48 for receiving externally threaded fittings 50 and 52. Each fitting includes an internal passage for the transporting of fuel or nitrous oxide from delivery tubes, such as delivery tubes 16 of FIG. 1. The details of the fuel injectors 20A and 20B are described and illustrated in more detail in U.S. Pat. No. 5,890,476.

Figure 3:
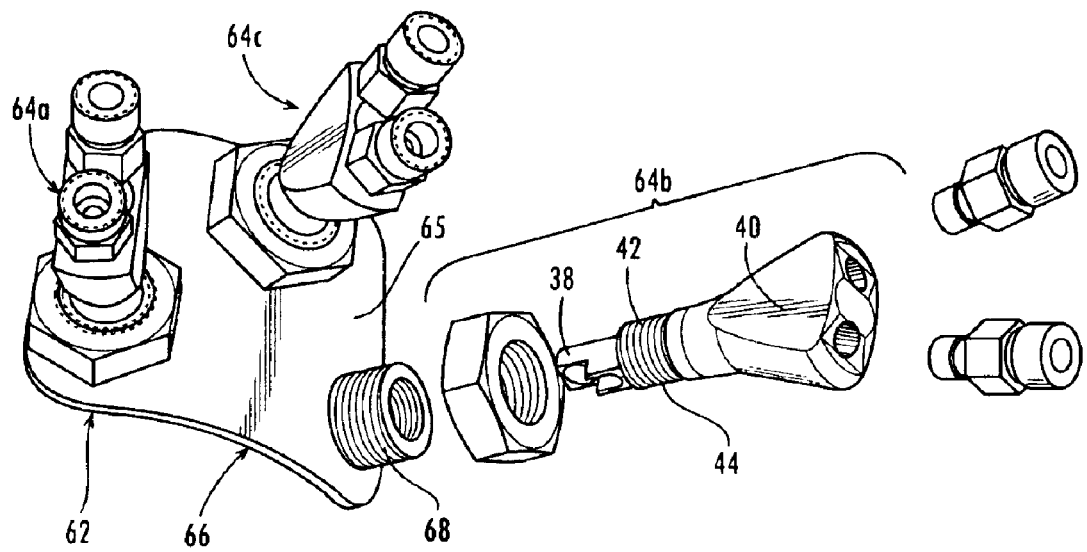
FIG. 3 is a perspective illustration, similar to FIG. 2, but showing three fuel injectors as they are mounted to the support platform, with one of the fuel injectors shown in expanded form.

FIG. 3 illustrates a similar fuel injector assembly 62 that includes three fuel injectors 64A, 64B and 64C. The fuel injectors 64A–C are similar to those shown in FIG. 2. The support platform 66 is similar to support platform 22 but being of a different size and shape for supporting a different number of fuel injectors 64A–C.

Nitrous oxide is present under pressure in a liquid form, typically at 1,000 psig, in a cylinder carried by the vehicle (not shown). The nitrous oxide is supplied through a supply line to the solenoid operated valve (FIG. 1) through delivery lines 16, to the fuel injector assembly, to pass through one of the fuel injectors 20A, 20B, or 64A–C. When the liquid nitrous oxide is exhausted from its nozzle, it loses its pressure and decreases in temperature as it evaporates in the air stream passing through the air supply conduit 10. In the meantime, the fuel passing through the adjacent internal conduit of the fuel injector is sprayed from its U-shaped recess where it is directed into the evaporating nitrous oxide. This creates an oxygen and fuel rich mixture for ignition in the cylinders of the internal combustion engine E.

The control valve V which is operated by solenoids functions to supply fuel and nitrous oxide to each of the fuel injectors. Preferably, the control valve V is operated so as to sequentially actuate the solenoids and sequentially charge the fuel injectors with fuel and nitrous oxide so that fuel and nitrous oxide will be supplied to the fuel injectors in a predetermined sequence in response to the speed of the vehicle, opening first one of the valves that supplies a fuel injector, then opening a second one of the valves that supplies a second fuel injector while the first valve is still open, and so forth through a sequence of all of the valves and fuel injectors. This has the effect of supplying a small amount of fuel and nitrous oxide in one stage of the valve operation, usually at slow engine speeds, and later increasing the amount of fuel and nitrous oxide supplied to the stream of air passing through the air supply conduit as the speed of the vehicle changes. Other sequences of nozzle operation can be employed. For example, two injectors could be used simultaneously at the beginning of the fuel injection process, and later a third fuel injector can be used to add additional fuel and nitrous oxide.

With this arrangement, the vehicle can take advantage of a small supply of fuel and liquid nitrous oxide, united as a spray flowing into the filtered air stream, and with the nitrous oxide evaporating as it emerges from its nozzle, and then, after the vehicle gains speed, injecting more fuel and more nitrous oxide into the filtered air stream with other injector nozzles.

While the drawings illustrate examples of two fuel injectors and three fuel injectors forming a fuel injector assembly, it will be understood that other arrangements of the fuel injectors can be used. For example, a single fuel injector can be used, or multiple ones, such as four or more fuel injectors can be used without departing from the scope and content of the invention.

With the arrangement described above, it can be seen that the support platform 22 functions as a support member for the fuel injectors 20. Also, the support platform can be of various shapes, such as that shown in FIG. 2 and that shown in FIG. 3, with other shapes being available. Likewise, the number and positions of the fuel injectors 20 can vary, according to the size and shape of the air supply conduit 10, and the performance of the vehicle to which the fuel injector assembly is to be applied.

While the internally threaded nut 34 functions as a fastener for holding the fuel injector assembly in place on the air supply conduit, other means of fastening or supporting the fuel injector assembly in this position on the air supply conduit can be utilized, such as adhesive applied to the bearing surface 24 of the support platform 22, bolts extending through openings formed in the air supply conduit 10 and the support platform 22 or a collar protruding from the intermediate body portion 42 of the fuel injectors. Other types of fasteners can be utilized so as to provide a firm mounting of the fuel injectors to the air supply conduit 10.

One of the features of the invention is the use of the support platform 22 inside the air supply conduit 10. The structure is such that the fuel injector assembly can be mounted to the air supply conduit at various positions along the length of the air supply conduit or at various positions about the circumference of the air supply conduit, so that the fuel injector assembly can be placed at a convenient location on the air supply conduit, such as to face the fuel injectors 20 in a direction that is convenient to the installer and maintenance person, and out of the way of adjacent components of the engine compartment of the vehicle.

While the support platforms 22 and 66 are described and illustrated with the connector conduits 26 and 68 protruding outwardly therefrom for extending through openings, such as opening 32 of FIG. 2, other means for connecting the fuel injectors to the support member can be utilized, if desired, such as there being no connector conduit 26 or 68, and the fuel injector being mounted to the support platform by the placement of a internally threaded nut on the back side of the support platform 22 or 66, and inserting the fuel injector through an opening formed in the air supply conduit, so that the nozzle tip 38 protrudes into the air supply conduit through an opening in the support platform 22, and the internally threaded nut is threaded onto the threads of the intermediate body portion 42 of the fuel injector so that the nut becomes a fastener to mount the fuel injector to the support member, with the fuel injector being supported by the air supply conduit.

When the fuel injector assembly 12 or 66 is to be mounted to an air supply conduit 10, holes are formed in the air supply conduit for receiving the fuel injectors. When several fuel injectors are to used, holes are formed in the external wall of the air supply conduit for each fuel injector, the holes being sized and spaced in accordance with the size and spaces between the fuel injectors. The support member, exemplified by the support platforms 22 and 66, is placed inside the air supply conduit 10 with the bearing surface 24 or 65 of the support member in engagement with the facing surface of the air supply conduit 10. The holes formed in the support platform are aligned with the holes in the air supply conduit. In those embodiments utilizing the connector conduits such as 26A and 26B, the connector conduits are moved telescopically through the holes in the air supply conduit so that they protrude to the outside of the external wall of the air supply conduit. The fasteners, such as internally threaded nuts 34 are applied to the connector conduits, clamping the support platform 22 in abutting relationship with the internal surface of the exterior wall of the air supply conduit. This provides a firm mount for the fuel injectors when the fuel injectors are screwed into the internally threaded through bores 28 of the connector conduits 26.

Although preferred embodiments of the invention have been disclosed in detail herein, it will be obvious to those skilled in the art that variations and modifications of the disclosed embodiments can be made without departing from the spirit and scope of the invention as set forth in the following claims.

I claim:

1. An air supply conduit for delivering a stream of air to an internal combustion engine and a nitrous oxide and fuel injection assembly mounted to said air supply conduit,
   said fuel injection assembly including:
   a support member mounted inside the air supply conduit,
   a connector extending from said support member to the outside of the air supply conduit,
   a fastener mounted to said connector outside the air supply conduit and holding said support member to said air supply conduit,
   at least one injector nozzle extending from outside the air supply conduit through said connector through said support member, and into the air supply conduit,
   said injector nozzle including a fuel orifice and a nitrous oxide orifice for communication with the stream of air moving through the air supply conduit,
   a fuel supply conduit and a nitrous oxide supply conduit in said injector nozzle in communication with said fuel orifice and said nitrous oxide orifice of its injector nozzle for injecting fuel and nitrous oxide into the stream of air moving through the air supply conduit,
   said nitrous oxide conduit and said nitrous oxide orifice configured to feed liquid nitrous oxide to the air stream and to induce the nitrous oxide to evaporate in said air stream; and
   a control valve for controlling the flow of fuel and nitrous oxide through said conduits and said injector nozzle.

2. The invention of claim 1, wherein said support member is arcuate and extends part way about said air supply conduit.

3. The invention of claim 1, wherein said air supply conduit is circular in cross section and said support member is an arcuate support strap that extends part way about the air supply conduit.

4. An air supply conduit for delivering a stream of air to an internal combustion engine and a nitrous oxide and fuel injection assembly mounted to said air supply conduit,
   said air supply conduit having an external wall defining an air passageway, and openings defined in said external wall,
   said fuel injection assembly including:
   a support member mounted inside the air supply conduit against said external wall at said openings,
   a connector extending from said support member through each opening in said external wall to the outside of the air supply conduit,
   a fastener mounted to said connectors outside the air supply conduit and holding said support member against the external wall,
   an injector nozzle extending from outside the air supply conduit through each said connector and into the air supply conduit, and
   each said injector nozzle including a fuel orifice and a nitrous oxide orifice positioned inside the air supply conduit for supplying fuel and nitrous oxide to the stream of air moving through the air supply conduit; and
   a control valve comprising individual control for supplying fuel and nitrous oxide at different times to each of said injector nozzles.

5. The invention of claim 4, wherein
   said air supply conduit is circular in cross section and said support member is an arcuate platform that extends part way about said air supply conduit.

6. The invention of claim 4, wherein
   said support member is a support platform having a bearing surface engaging the external wall of said air supply conduit.

7. The invention of claim 4, wherein
   said connector comprises a cylindrical connector conduit extending from said support member and having internal threads for receiving said nozzle and external threads for receiving said fastener.

8. A nitrous oxide and fuel injection assembly for mounting to an air supply conduit of an internal combustion engine, the air supply conduit having an external wall defining an air passageway for passing air to the engine, for mixing fuel and nitrous oxide with the air stream moving through the air supply conduit, said injection assembly comprising:
   a support member mounted inside the air supply conduit against said external wall and extending partially about the inside of the air supply conduit, a plurality of injector nozzles extending from outside the air supply conduit and into the air supply conduit, and mounted to said support member, said injector nozzles each including a fuel orifice and a nitrous oxide orifice positioned inside the air supply conduit for supplying fuel and nitrous oxide to the stream of air moving through the air supply conduit.

9. The nitrous oxide and fuel injector assembly of claim 9, and further including:

a connector conduit extending from said support member through the external wall of said air supply conduit, a fastener fastening said support member to the external wall of the air supply conduit, and said nozzle extending through said connector conduit.

10. The nitrous oxide and fuel injector assembly of claim 8, wherein said support member has a bearing surface shaped to conform to the shape of the facing surface of the inside of said external wall of said air supply conduit, with a fastener positioned outside said air supply conduit holding said bearing surface against the facing surface of the inside of the external wall.

11. A method of mounting an injector nozzle on an air supply conduit extending toward an internal combustion engine, comprising:

forming a hole in the external wall of the air supply conduit, placing a support platform inside the air supply conduit, extending a connector conduit protruding from the support platform from inside the external wall through the hole to the outside of the external wall, and mounting a nozzle through the connector conduit.

12. The method of claim 11, and further including:

attaching a fastener about said connector conduit outside the external wall of the air supply conduit for holding the support platform to the external wall.

13. The method of claim 11, wherein the step of forming a hole in the external wall of the air conduit comprises forming a plurality of holes in the external wall, and the step of extending a connector conduit protruding from the support platform through the hole comprises extending a connector conduit from the support platform through each hole.

14. An air supply conduit for delivering a stream of air to an internal combustion engine and a nitrous oxide and fuel injection assembly mounted to said air supply conduit, said air supply conduit having a side wail and an opening through said side wall, said fuel injection assembly including:

a support member mounted inside the air supply conduit at said opening, a connector extending from said support member through said opening to the outside of the air supply conduit, a fastener mounted to said connector outside the air supply conduit and bearing against said air supply conduit and holding said support member to said air supply conduit, an injector nozzle extending from outside the air supply conduit through said connector, through the hole of said air supply conduit, through said support member, and into the air supply conduit, said injector nozzle including a fuel orifice and a nitrous oxide orifice for communication with the stream of air moving through the air supply conduit, a fuel supply conduit and a nitrous oxide supply conduit in said injector nozzle in communication with said fuel orifice and said nitrous oxide orifice of its injector nozzle for injecting fuel and nitrous oxide into the stream of air moving through the air supply conduit, said nitrous oxide conduit and said nitrous oxide orifice configured to feed liquid nitrous oxide to the air stream and to induce the nitrous oxide to evaporate in said air stream; and a control valve for controlling the flow of fuel and nitrous oxide through said conduits and said injector nozzle.

* * * * *

UNITED STATES PATENT AND TRADEMARK OFFICE
CERTIFICATE OF CORRECTION

PATENT NO. : 6,935,322 B2
DATED : August 30, 2005
INVENTOR(S) : Barry S. Grant

It is certified that error appears in the above-identified patent and that said Letters Patent is hereby corrected as shown below:

Column 9,
Line 9, change the claim number that claim 9 depends from, from "9" to -- 8 --.

Signed and Sealed this

Twenty-fifth Day of October, 2005

JON W. DUDAS
*Director of the United States Patent and Trademark Office*